US007519582B2

(12) United States Patent
Fagin et al.

(10) Patent No.: US 7,519,582 B2
(45) Date of Patent: Apr. 14, 2009

(54) SYSTEM AND METHOD FOR PERFORMING A HIGH-LEVEL MULTI-DIMENSIONAL QUERY ON A MULTI-STRUCTURAL DATABASE

(75) Inventors: Ronald Fagin, Los Gatos, CA (US); Ramanathan V. Guha, Los Altos, CA (US); Phokion Gerasimos Kolaitis, Los Altos, CA (US); Jasmine Gina Novak, Mountain View, CA (US); Shanmugasundaram Ravikumar, Cupertino, CA (US); Dandapani Sivakumar, Cupertino, CA (US); Andrew Stephen Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 11/151,056

(22) Filed: Jun. 13, 2005

(65) Prior Publication Data

US 2006/0282411 A1 Dec. 14, 2006

(51) Int. Cl.
*G06F 17/30* (2006.01)
(52) U.S. Cl. .......................................................... 707/3
(58) Field of Classification Search .................. 707/3
See application file for complete search history.

(56) References Cited

U.S. PATENT DOCUMENTS

| 5,388,259 | A | * | 2/1995 | Fleischman et al. ............ 707/5 |
| 6,073,134 | A | * | 6/2000 | Shoup et al. .................... 707/3 |
| 6,581,068 | B1 | | 6/2003 | Bensoussan et al. ...... 707/104.1 |
| 2003/0172078 | A1 | | 9/2003 | Stumpf ....................... 707/100 |
| 2003/0217027 | A1 | | 11/2003 | Farber et al. .................... 707/1 |
| 2003/0229635 | A1 | * | 12/2003 | Chaudhuri et al. ............. 707/6 |
| 2006/0020608 | A1 | * | 1/2006 | D'Hers et al. ............... 707/100 |

* cited by examiner

*Primary Examiner*—Christian P. Chace
*Assistant Examiner*—Kellye Buckingham
(74) *Attorney, Agent, or Firm*—Samuel A. Kassantly; Shimokaji & Associates, P.C.

(57) ABSTRACT

A multi-structural query system performs a high-level multi-dimensional query on a multi-structural database. The query system enables a user to navigate a search by adding restrictions incrementally. The query system uses a schema to discover structure in a multi-structural database. The query system leaves a choice of nodes to return in response to a query as a constrained set of choices available to the algorithm. The query system further casts the selection of a set of nodes as an optimization. The query system uses pairwise-disjoint collections to capture a concise set of highlights of a data set within the allowed schema. The query system further comprises efficient algorithms that yield approximately optimal solutions for several classes of objective functions.

11 Claims, 6 Drawing Sheets

SYSTEM AND METHOD FOR PERFORMING A HIGH-LEVEL MULTI-DIMENSIONAL QUERY ON A MULTI-STRUCTURAL DATABASE

FIELD OF THE INVENTION

The present invention generally relates to querying a database. More specifically, the present invention pertains formulating and performing a high-level multi-dimensional query of a dynamic multi-structure data set.

BACKGROUND OF THE INVENTION

With the growing importance of managing massive repositories of structured, semi-structured, and unstructured data, an important task for database research is the development of frameworks that support a rich set of analytical operations on such large scale. A primary goal for these systems is to achieve a high degree of abstraction in defining the underlying concepts (schema, objects, queries), so that the framework gives rise to a coherent and principled architecture for efficient information management rather than an assortment of ad hoc solutions.

Considering for example, a large collections of media articles that can be segmented by a number of "dimensions":
- By time: articles from April 2004, or from 1978;
- By content type: articles from newspapers, or from magazines, and within magazines, from business magazines, or from entertainment magazines;
- By geography: articles from the U.S., or from Europe, and within Europe, from France or from Germany;
- By topic: articles about a war, a hurricane, or an election, and within these topics, by subtopic.

These different dimensions may be correlated; for instance, knowing the content type may give information about the topics. The initial dimension in this list (time) can be viewed as numerical and as the example shows, a user may be interested in intervals of time at various granularities. The other dimensions in this list (content type, geography, and topic) can be viewed as hierarchical.

Because of the rich nature of the data (in this case, documents), a user is interested in probing the data with queries that are much richer than those in a typical database system. For example, a user is interested in the following types of queries:
- What are the ten most common topics in the collections?
- From 1990 to 1995, how did articles break down across geography and content type?
- Which subtopics caused the sudden increase in discussion of the war? Are these subtopics different among European newspapers?
- Break the early 1990s into ten sub-periods that are most topically cohesive, and explain which topics were hot during each period.
- Break documents that mention the President by topic so that they are most closely aligned with different content types, to capture how different types of media with different audiences focused on particular topics.

These queries are rather "fuzzy": there is not necessarily a clear "right answer." These queries are further unlike standard database queries in that these queries are resolved not by, for example, searching indices, but instead by an optimization procedure. Furthermore, these queries seek to provide the user with the highlights or salient characteristics of the data set.

An ability to use "fuzzy" queries is especially useful in business intelligence systems and systems using multi-faceted search. Multi-faceted search is used, for example, on product websites. A user searches for products on a site that matches selected criteria, restricting results to a type of product, a product cost, etc. Conventional multi-faceted search technologies require that search restrictions be placed concurrently. However, this approach can return a null set, with no results. The user then has no clear idea of what restrictions to change to obtain results for the query.

The business intelligence systems and systems using multi-faceted search comprise objects. For a business intelligence system, the object can be a transaction; for the system using a multi-faceted search, the object can be a product. Each object comprises different dimensions of ancillary data. A product can have price, manufacturer, features, etc., as dimensions. A transaction can have geography of the transaction, amount of the transaction, product type involved in the transaction, etc.

Several conventional query systems or approaches have addressed a variety of techniques for formulating queries for repositories of structured, semi-structured, and unstructured data. One conventional formulation for queries distinguishes between measures, which are numerical and are the target of aggregations, and dimensions, which are often hierarchical. However, this distinction is not required, and there are formulations in which both are treated uniformly.

Another conventional approach describes a formulation in which each dimension is a lattice, and a joint lattice is defined over multiple dimensions. Although this technology has proven to be useful, it would be desirable to present additional improvements. It would be desirable to perform optimizations over a resulting multi-dimensional lattice rather than to characterize the set of possible queries and hence the candidate materializations that may be considered.

One conventional approach describes, in the context of a cube operator, aggregation functions that may be distributive, algebraic, or holistic. Another conventional approach considers the "BIKM" problem of unifying business intelligence and knowledge management, by creating data cubes that have been augmented by additional information extracted through text analysis.

Yet another conventional approach proposes that online analytical processing systems may support multiple query frameworks, possibly at different levels of granularity. There have been a number of such approaches suggesting frameworks that move beyond traditional hypothesis-driven query models into discovery-driven models. Some of these conventional approaches have utilized data mining to extract association rules on cubes. Another conventional approach identifies areas of the data space that are likely to be surprising to the user. The mechanisms of this approach allow the user to navigate a product lattice augmented with indicators suggesting which cells at a particular location are surprising, and which paths lead to surprising cells. This conventional approach produces exceptions at all levels of the cube, rather than at the leaves. One conventional approach considers partitions of the cube to summarize the "semantics" of the cube; all elements of a partition belong to the same element of a particular type of equivalence relation.

In general, conventional approaches to querying multi-dimensional data specify certain nodes of a multi-dimensional lattice for which results may be computed; these nodes are, for example, all the months of 2003 crossed with all the products in a certain category. Further characteristics of conventional online analytical processes comprise a single entry for each cell of a cube in a fact table and dimensions that are required to be leveled or fixed-depth. In terms of business intelligence systems and systems using multi-faceted search, these conventional systems require well-defined queries.

Although conventional approaches have proven useful, it would be desirable to present additional improvements. What is needed is a search technology that allows a user to focus on discovery and exploration of data, allowing a user to formulate higher-level, less structured queries to search for trends or discover previously unknown correlations in data. Thus, there is a need for a system, a computer program product, and an associated method for performing a high-level multi-dimensional query on a multi-structural database. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for performing a high-level multi-dimensional query on a multi-structural database. The present system leaves a choice of nodes to return in response to a query as a constrained set of choices available to the algorithm. The present system further casts the selection of a set of nodes as an optimization.

The present system is a framework for expressing and computing the highlights of a large and complex data set. This framework comprises a data model that is rich enough to represent the kinds of structures found in real applications. The present system uses pairwise-disjoint collections (PDC) as a basic notion that captures a concise set of highlights of a data set. The present system enables rich queries as optimization problems that map the underlying data into a succinct pairwise-disjoint collection within the allowed "schema." The present system "breaks" the data set into regions, and retrieves regions corresponding to a query. The present system further provides efficient algorithms that yield approximately optimal solutions for several classes of objective functions. In response to a query, the present system generates a random sample of a specified size and also provides for each document in the random sample the entries that specify where the document belongs in each dimension. The queries of the present system express how a client asks for an answer and how the present system computes the answer. Throughout the present description reference is made, for illustration purpose only, random samples that are used in an exemplary (but not exclusive) embodiment, to allow the algorithms to apply to larger-scale data.

The present system uses a schema to discover structure in a multi-structural database (MSDB). The schema comprises a set of dimensions and a set of objects. An object can have zero or more values in each dimension. Data elements are interchangeably referenced as objects and documents, depending on the context. The schema specifies how a set of data objects can be segmented based on each dimension. Each type of dimension admits restrictions in a natural way; e.g., a numerical dimension may be restricted to an interval, and a hierarchical dimension to a node of the hierarchy.

A query is an optimization problem that maps a given collections of data objects into a pairwise-disjoint collections of a given size that optimizes an objective function defined on the set of permissible restrictions of the entire collections of data objects. Since the intent of analytical queries is to seek an understanding of trends in the data, rather than obtain exact answers, good approximations are acceptable if they are efficiently computable. An example is to ask for the ten time intervals that exhibit the maximum contrast in the number of articles about Europe and articles about Canada.

The present system provides a conceptual setting for formulating and analyzing queries in a principled manner, present highly efficient algorithms (a linear time algorithm for a very important schema family and an indexing/sampling methodology), and demonstrates the richness of the framework and the goodness of algorithms of the present system on a massive, petabyte-scale collections of documents.

The present system provides unbiased samples as follows. Each document is assigned a unique identifier computed as the hash of a primary key; for web content, this key is the URL of the document. The postings list for any token is then ordered by this hash value. Complex boolean queries are then computed by merging together postings, all of which are ordered according to the shared hash values. The prefix of an arbitrarily complex query is then guaranteed to be a random subset of the entire result set.

The present system uses analytical operations (divide, differentiate, discover) in the form of optimization problems and anticipates a need for additional operations. The present system encapsulates operations as higher-level constructs with precisely specified mathematical properties. The present system allows application of these basic algorithms a broader class of functions.

The present system enhances the notion of what constitutes a "query." As previously mentioned, analytical operations of the present system are formulated as optimization problems that map a set of data objects into a pairwise-disjoint collections within a schema.

While the lattice-based formulation of the present system is quite general, for the sake of obtaining efficient algorithms, the present system focuses on two special cases of dimensions: numerical and hierarchical. These special cases arise frequently in practice, requiring efficient algorithms.

Typically, an OLAP fact table contains a single entry for each cell of the cube; this is typically not the case for the present system. Also, objects used by the present system may belong to one or more locations within a dimension, which is typically not the case in OLAP (with certain lattices corresponding to time as notable exceptions). Dimensions of the present system are typically not required to be leveled or fixed-depth. The present system further utilizes single dimensions in which the size of the lattice is quadratic in the number of distinct leaves (all intervals of a line, for example).

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

A lattice: A representation of a partial ordering on a set of elements. A lattice is a dimension such as a geography dimension, having a plurality of elements. Reference is made for example, to J. P. Tremblay and R. Manohar "Discrete Mathematical Structures with Applications to Computer Science," McGraw Hill, New York, 1975.

A multi-dimension: Dimensions with the same structure as single dimensions. A multi-dimensional lattice is the direct product of each individual lattice, as defined above.

A pairwise-disjoint collection for a set of dimensions: A set of nodes in the direct product lattice such that, for each pair of nodes in the set, the meet of the nodes is bottom.

A multi-structural database or MSDB (X, D, R) comprises a universe $X=\{x_1, \ldots, x_n\}$ of objects, a set $D=\{D_1, \ldots, D_n\}$ of dimensions, and a membership relation R specifying the elements of each dimension to which a document belongs.

A Non-Overlapping Collection (NOC): A pairwise-disjoint collection (PDC) is an instance of the non-overlapping collection of the elements. While the term "non-overlapping" is used, it should be clear that this term allows for some, non-substantial overlap of the elements, and is not intended to limit the meaning of this term to the literal interpretation of strict non-overlap.

Figure 1:
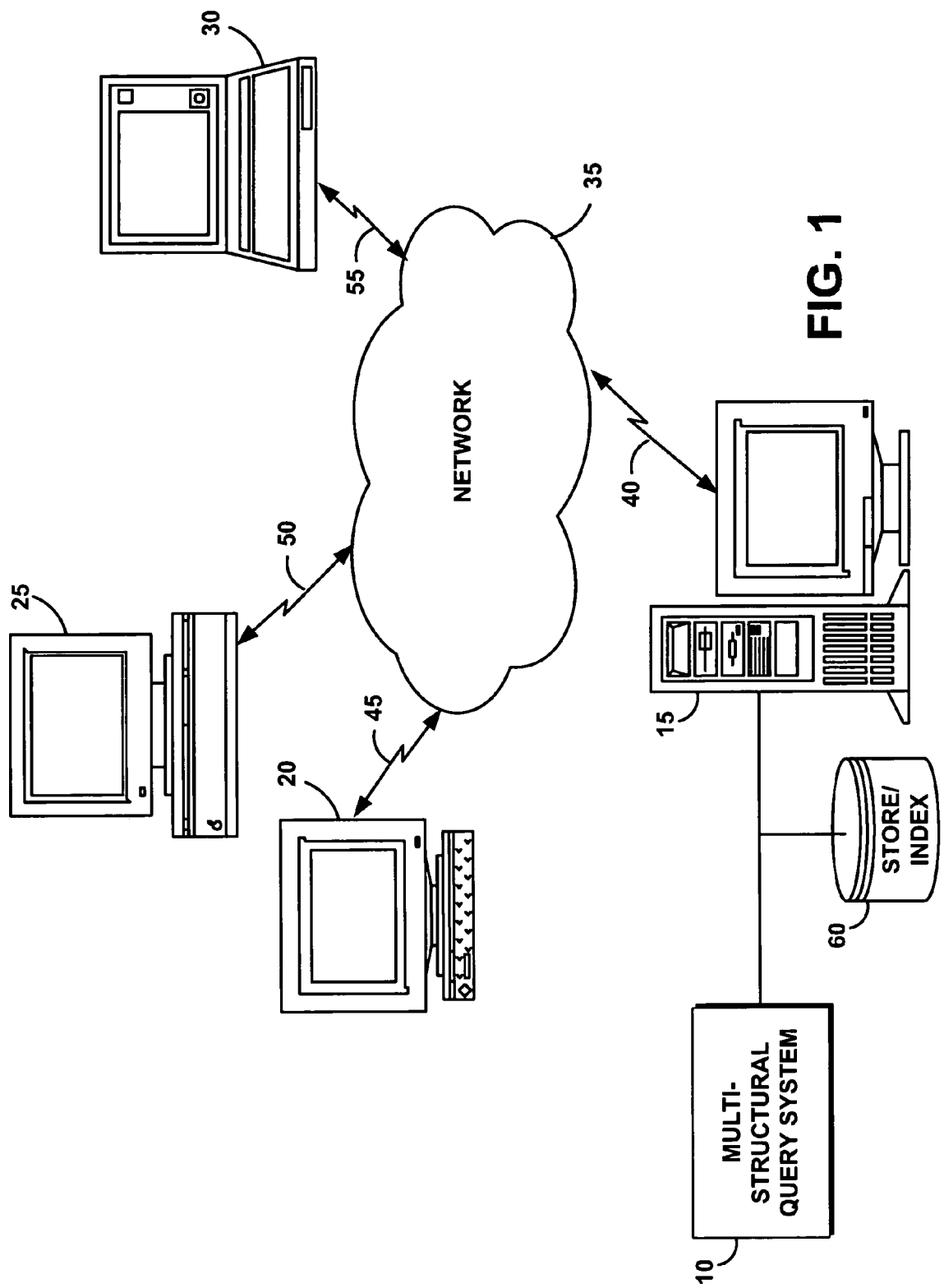
FIG. 1 is a schematic illustration of an exemplary operating environment in which a multi-structural query system of the present invention can be used.

FIG. 1 portrays an exemplary overall environment in which a system and associated method for performing a high-level multi-dimensional query on a multi-structural database according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Clients, such as remote Internet users or applications, are represented by a variety of computers such as computers 20, 25, 30, and can access the host server 15 through a network 35. Computers 20, 25, 30 each comprise software that allows the user to interface securely with the host server 15. The host server 15 is connected to network 35 via a communications link 40 such as a telephone, cable, or satellite link. Computers 20, 25, 30, can be connected to network 35 via communications links 45, 50, 55, respectively. While system 10 is described in terms of network 35, computers 20, 25, 30 may also access system 10 locally rather than remotely. Computers 20, 25, 30 may access system 10 either manually, or automatically through the use of an application.

A store/index 60 stores data to be queried by system 10. The store/index 60 further stores an index of the data.

Figure 2:
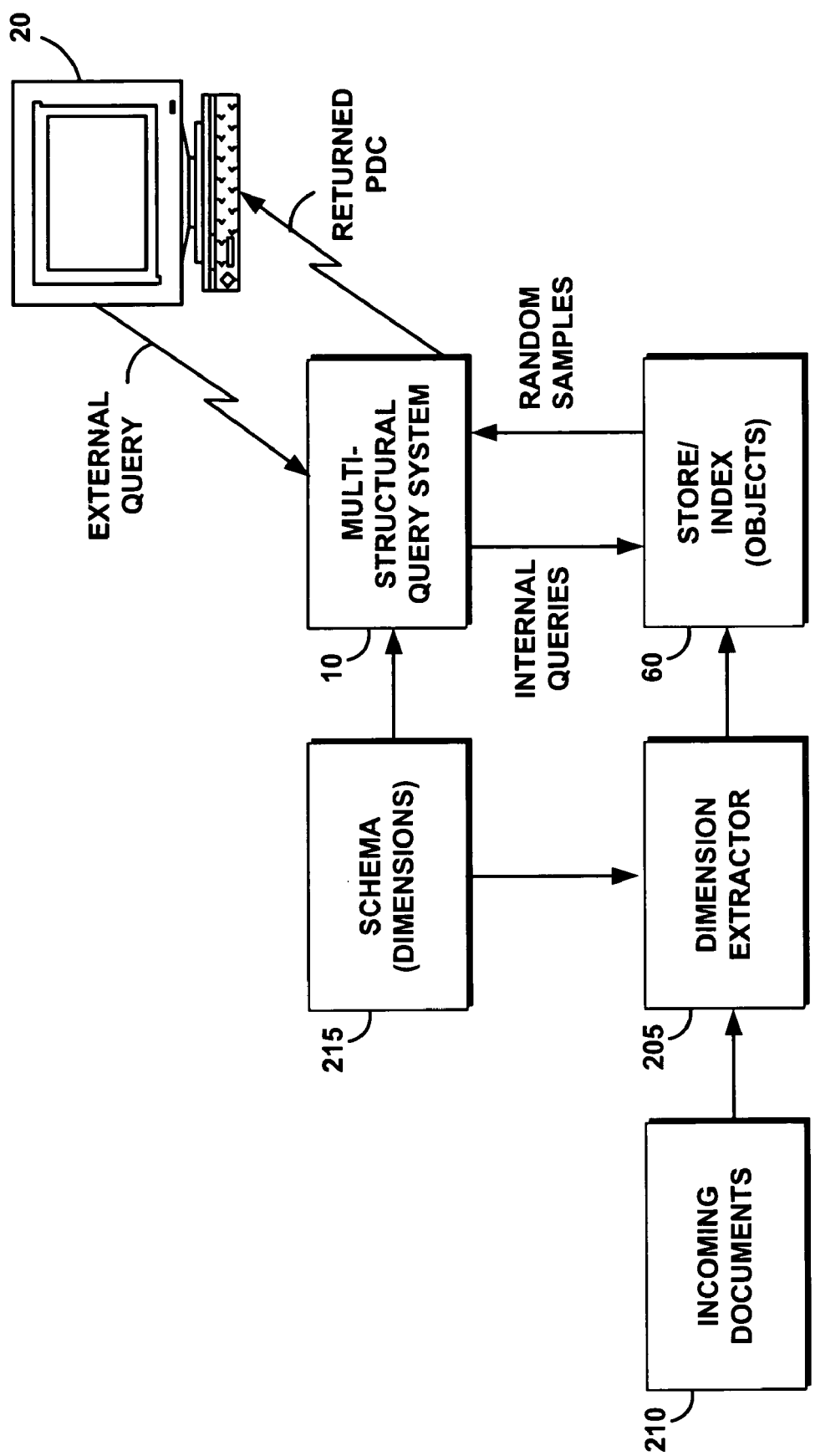
FIG. 2 is a block diagram of the high-level architecture of the multi-structural query system of FIG. 1.

FIG. 2 shows a block diagram of system 10 and a multi-structural database over a large corpus of textual documents. One or more of clients 20, 25, 30 send an external query to system 10. System 10 sends internal queries to the store/index 60 and receives random samples according to the query from the store/index 60. The store/index 60 is a general backend capable of storing and indexing large collections of textual data. The store/index 60 handles large amounts of data and provide in an efficient manner the random samples that the algorithms of system 10 require to run. While system 10 is described for illustration purposes only in terms of documents, it should be clear that the invention is applicable as well to, for example, any type of object.

System 10 comprises the implementation of query algorithms. System 10 generates a random sample from the store/index 60 and then processes this random sample to generate a pairwise-disjoint collection.

A dimension extractor 205 processes documents as they arrive, tagging them with information about where the document belongs in each dimension. In some cases, the dimension extractor 205 uses metadata that arrives with the document: some corpora arrive with a publication date or even a set of topic tags that may be converted directly into elements of R, a relation on documents and dimensions. Other types of metadata may be extracted by text processing, such as the entities mentioned in a document, or the topic of the document as determined by an automated classifier.

Incoming documents 210 are tagged according to a schema 215. The schema 215 specifies segmentations of a set of data objects such as the incoming documents 210 according to distinct criteria such as, for example, a taxonomy based on a hierarchical attribute. When a multi-structural query arrives from a client, system 10 processes the query. System 10 generates a random sample of a specified size and also provides for each document in the random sample the entries that specify where the document belongs in each dimension.

The store/index 60 produces a random sample for processing by the system 10. As the size of the random sample increases, the analysis may return nodes representing increasingly tiny fractions of the overall corpus at the cost of increasing computation time. A random sample of size 1,000, for example, means that elements of the multi-dimension are not represented at all in the sample unless the elements contain roughly one tenth of one percent of the documents in the corpus. The store/index 60 provides the capability to produce the required random sample.

System 10 comprises a lattice-based formulation that focuses on two special cases of dimensions: numerical and hierarchical. These special cases arise frequently in practice, requiring efficient algorithms. System 10 comprises a unified approach to handling these diverse types of dimensions. Namely, system 10 formalizes each dimension as a lattice. For example, a geography dimension is a lattice whose elements comprise, for example, Europe and France, and a time dimension is a lattice whose elements are intervals at various granularities.

A document in the incoming documents 210 is processed by a series of mining agents that extract its entries in the multi-structural relation R. For example, the publication date of the document is extracted for the "time" dimension. Entities appearing on the page are extracted, for example, for the "people", "organizations" and "locations" dimensions. A URL associated with the document is processed to extract the "source collection" dimension. The document is then annotated with tokens corresponding to the location or locations of the document in each dimension. For hierarchical dimensions, tokens are created for the upward closure of each location, so if the document mentions entity "Mel Gibson" then this token is created in addition to a "movie star" and a "person." If the store/index 60 also keeps keyword tokens to allow constructions of relevant subsets, then the overall overhead of keeping tokens for locations with hierarchical dimensions is vanishingly small compared to the overhead of maintaining a standard keyword index.

Numerical dimensions are indexed as is, but an indexer of store/index 60 provides built-in support for range queries. Consequently, the document is returned during queries for any containing interval.

System 10 provides unbiased samples as follows. Each document is assigned a unique identifier computed as the hash of a primary key; for web content, this key is the URL of the document. The postings list for any token is then ordered by this hash value. Complex boolean queries are then computed by merging together postings, all of which are ordered according to the shared hash values. The prefix of an arbitrarily complex query is then guaranteed to be a random subset of the entire result set.

A lattice is endowed with "meet" and "join". For example, in a geography dimension, a join of the European countries is Europe, and in a time dimension, a meet of two time intervals is an intersection of the two time intervals. Each data element (i.e., each document) is associated with various elements in the lattice. When a data item is associated with a lattice element, it is also associated with every element above it in the lattice; for example, a document about France is also a document about Europe. Lattice elements whose meet is bottom, the minimal element of a lattice, are considered disjoint concepts. For example, in a topics dimension, sports and politics are thought of as disjoint concepts. However, there may be a document associated with both of these concepts (such as a document about a bodybuilder who is also a governor). System 10 further considers lattices that are the result of taking the product of a subset of lattices. For example, "French newspaper" is an element of the lattice that is the product of the geography lattice and the content type lattice.

Besides unifying various types of allowed segmentations of data, the lattice-based approach of system 10 is able to concisely describe sub-collections of the data. Elements of a lattice are restrictions such as, for example, "French newspaper," and hence can be easily understood by a user in the terms used to define the schema. The fundamental collections of data objects in the framework of system 10 are the set of data objects associated with a lattice element.

The framework of system 10 further comprises non-overlapping regions in the form of a pairwise-disjoint collection. The pairwise-disjoint collection is a set of elements of a lattice (either a base lattice corresponding to a single dimension, or a product lattice corresponding to one or more dimensions) whose pairwise meet is bottom. In spite of the word "disjoint", there may be a particular data element that is associated with two distinct elements of a pairwise-disjoint collection, such as the document previously mentioned about the bodybuilder who is also a governor. A pairwise-disjoint collections thus represents a collections of conceptually disjoint concepts, and is a model of what a data analysis operation returns to the user. System 10 defines pairwise-disjoint collections at a schema level, rather than an instance level.

A lattice is a representation of a partial ordering on a set of elements. It may be defined in terms of a partial order, or in terms of the operations meet, written $\wedge$, and join, written $\vee$. System 10 utilizes the latter definition. A lattice then is a set of elements closed under the associative, commutative binary operations meet and join, such that for all elements a and b, system 10 has $a \wedge (a \vee b) = a \vee (a \wedge b) = a$. The lattice induces a natural partial order: $a \leq b$ if and only if $a \wedge b = a$. For a lattice L, $a \in L$ implies that a is an element of the set.

A lattice is bounded if it contains two elements $\top$ and $\bot$, called top and bottom, such that $a \wedge \bot = \bot$ and $a \vee \top = \top$ for all elements a. All finite lattices are bounded.

System 10 uses #(A) to refer to the cardinality of set A.

A multi-structural database (or MSDB) (X, D, R) comprises a universe $X = \{x_1, \ldots, x_n\}$ of objects, a set $D = \{D_1, \ldots, D_n\}$ of dimensions, and a membership relation R specifying the elements of each dimension to which a document belongs. System 10 considers each $x_i$ as an identifier such that this identifier may reference arbitrary additional data or metadata. While system 10 is described for illustration purposes in terms of a document, it should be clear that the invention is applicable as well to, for example, any type of object. A dimension $D_i$ is a bounded lattice and system 10 assumes that the lattice nodes used in all lattices are distinct; the vocabulary $V = \cup_i D_i$ comprises all such lattice nodes. The membership relation $R \subseteq X \times V$ indicates that a data object "belongs to" a lattice element. System 10 requires that R be upward closed, i.e., if $\langle x, l \rangle \in R$ and $l \leq l'$, then $\langle x, l' \rangle \in R$. System 10 defines $X|_l$, read X restricted to l, as $X|_l = \{X \in X | \langle x, l \rangle \in R\}$.

Similarly, system 10 defines one or more dimensions to have the same structure as single dimensions. For nonempty $D' \subseteq D$, the multi-dimension MD(D') is defined as follows. If D' is a singleton, the multi-dimension is the dimension of the single element. Otherwise, if $D' = \{D_1, \ldots, D_d\}$, then MD(D') is again a lattice whose elements are $\{\langle l_1, \ldots, l_d \rangle | l_i \in L_i\}$, where $\langle l_1^1, \ldots, l_d^1 \rangle \vee \langle l_1^2, \ldots, l_d^2 \rangle = \langle l_1^1 \vee l_1^2, \ldots, l_d^1 \vee l_d^2 \rangle$, and likewise for $\wedge$. The membership relation R is then extended to contain $(x, \langle l_1, \ldots, l_d \rangle)$ if and only if it contains $\langle x, l_i \rangle$ for all i. This lattice is sometimes called the direct product of the dimensional lattices.

Each lattice element is a conceptual way of grouping together documents. All elements of the same lattice may represent conceptual groupings within the same logical family, for example, groupings of documents based on their topic. The meet of two conceptual groupings is the most general concept that is a specialization of both. For example, the meet of documents referring to events of the 1800s and documents referring to events from 1870-1930 may be documents referring to events from 1870-1899. Likewise, the join of two conceptual groupings may be seen as the most specific concept that is a generalization of both. The join of the two concepts described above may be all documents referring to events occurring between 1800 and 1930.

Two concepts whose meet is $\bot$ may be seen as conceptually non-overlapping. Objects in the database can be part of both groups. For example, a dimension capturing a particular way of breaking documents into topics may contain a subtree about sports, with a subnode about basketball; and can also contain elsewhere a node about politics. Just because a document appears that happens to discuss both sports and politics (because it is about sports legislation), this does not mean that the two topics are conflated in the formalism. The membership relation allows a document to belong to two lattice elements whose meet is $\bot$. Dimensions represent abstract conceptual groupings, but individual objects need not adhere exactly to these groupings. As individual documents belong to more and more conceptually disjoint regions of a dimension, the discriminative power of that dimension diminishes.

A pairwise-disjoint collection provides a way of breaking a set of documents into conceptually non-overlapping pieces such that each piece can be easily described using the elements of a particular multi-dimension. Formally, for any multi-dimension MD(D') and any set $S = \{l_1, \ldots, l_d\}$ of elements of the multi-dimension, S is a pairwise-disjoint collection if $l_i \wedge l_j = \bot$ for all i, j with $i \neq j$.

A pairwise-disjoint collection, in contrast to a general set of clusters, can be communicated easily and concisely to the user in terms that already exist in the schema; namely, the particular elements of MD(D') that define each member of the pairwise-disjoint collection. Each analytical operation takes a multi-dimension and other information, returning a pairwise-disjoint collection over the given multi-dimension. The analytical operation uses the other information to determine which pairwise-disjoint collection may be returned.

In general, system 10 considers a pairwise-disjoint collection as a segmentation of the conceptual space of the database. For example, a pairwise-disjoint collection may contain both the sports and politics nodes of a dimension-capturing topic. As these nodes meet at ⊥, they do not share any subconcepts. As discussed previously, there may be a document that exists in both nodes at once because it discusses, for example, sports legislation.

Figure 3A:
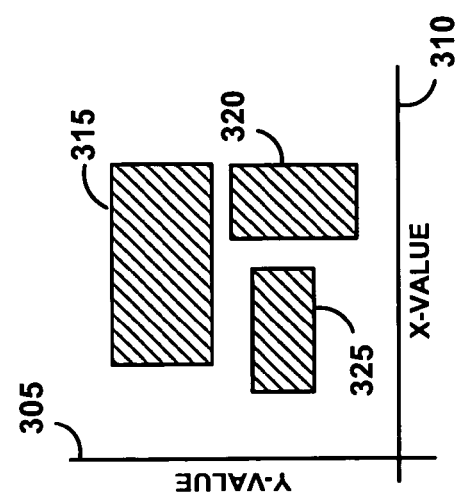
FIG. 3 is comprised of FIGS. 3A, 3B, and 3C, and illustrates a concept of non-overlapping regions applied to query searches performed by the multi-structural query system of FIGS. 1 and 2.
Figure 3B:
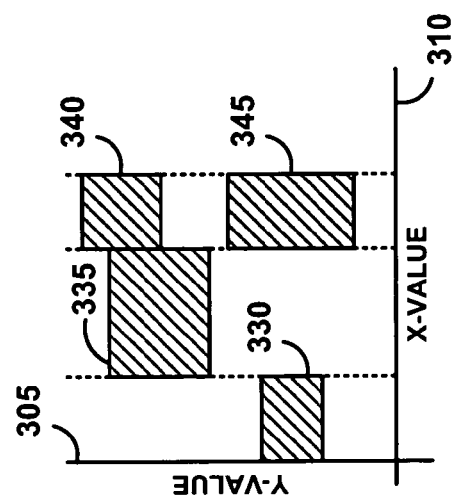
Figure 3C:
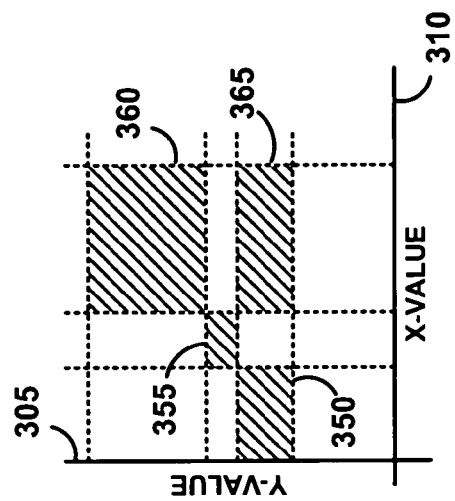

FIG. 3 (FIGS. 3A, 3B, 3C) illustrates a graphical representation of examples of general, sequential, and factored types of pairwise-disjoint collections for two numerical dimensions. FIG. 3 comprises a y-value 305 on a y-axis and an x-value 310 on an x-axis. FIG. 3A represents a general pairwise-disjoint collection. Region 315, 320, and 325 are regions in the graph of FIG. 3A that are non-overlapping, also referenced as a pairwise-disjoint collection.

FIG. 3B represents a graph of a sequential pairwise-disjoint collection comprising region 330, 335, 340, 345. The sequential pairwise-disjoint collection is more specific than a general pairwise-disjoint collection in that each region is constrained within predetermined vertical strips.

FIG. 3C represents a graph of a factored pairwise-disjoint collection comprising region 350, 355, 360, 365. The factored pairwise-disjoint collection is more specific that the sequential pairwise-disjoint collection in that each region is constrained within predetermined vertical and horizontal strips.

As another example, consider two numerical dimensions, and the associated multi-dimension. A pairwise-disjoint collection in this multi-dimension corresponds to a tiling of the plane using axis-parallel rectangles.

A pairwise-disjoint collection is complete for a subset $X' \subseteq X$ of the objects if for every $x \in X'$, there is some l in the pairwise-disjoint collection such that $\langle x, l \rangle \in R$; that is, every document belongs to some element of the pairwise-disjoint collection. When a pairwise-disjoint collection is complete, it is complete for X.

In many situations, conveying to the user an arbitrary pairwise-disjoint collection over a complex multi-dimension may be quite difficult, and system 10 may choose to restrict the allowable pairwise-disjoint collections. System 10 comprises increasingly restrictive pairwise-disjoint collections: general, sequential, and factored.

Consider a pairwise-disjoint collection H over MD(D'), and assume dimension $D_i \in D'$. Let $H|_{D_i} = \{l_i | \langle l_1, \ldots, l_d \rangle \in H\}$ and for any element $l \in H|_{D_i}$, let $H|_{\bar{D}_i}(l) = \{\langle l_1, \ldots, l_{i-1}, l_{i+1}, \ldots, l_d \rangle | \langle l_1, \ldots, l_d \rangle \in H, l_i = l\}$.

A general pairwise-disjoint collection has no restrictions.

A sequential pairwise-disjoint collection breaks the data via a pairwise-disjoint collection in some dimension, and then recursively subdivides each resulting data set using the next dimension, etc. As discussed previously in the example of two numerical dimensions, a pairwise-disjoint collection that is sequential contains either horizontal or vertical strips, each of which may be broken respectively by arbitrary vertical or horizontal lines. Formally, a sequential pairwise-disjoint collection is defined recursively as follows.

A pairwise-disjoint collection over a single dimension is sequential.

A pairwise-disjoint collection H over $D' \subseteq D$ is sequential for an ordering $(D_1', \ldots, D_d')$ the dimensions D' if $H|_{D_d'}$ is a pairwise-disjoint collection and $H|_{\bar{D}_d}(l)$ is sequential for $(D_1', \ldots, D_{d-1}')$ for all $l \in H|_{D_d'}$.

A pairwise-disjoint collection is sequential for D' if there exists an ordering of D' for which it is sequential.

A pairwise-disjoint collection is factored if it represents the cross-product of pairwise-disjoint collections in each dimension. In the previously discussed example of two numerical dimensions, a factored pairwise-disjoint collection is defined by a set of vertical and horizontal lines. Formally, a pairwise-disjoint collection H over $D' \subseteq D$ is factored if $H = H|_{D_1} \times \ldots \times H|_{D_{\#(D')}}$. Every factored pairwise-disjoint collection is a sequential pairwise-disjoint collection for every ordering of the dimensions.

One type of dimension is a numerical dimension, corresponding to points on a real line. Consider a setting in which each element of X has a real-valued timestamp associated with it. The lattice elements of this dimension are the intervals of the real line, with meet and join of two elements defined as the largest interval belonging to both elements, and the smallest interval containing both elements, respectively. If required, the metric corresponding to a line is the line distance $|x-y|$.

Another type of dimension is a hierarchical dimension, corresponding to a tree. As an example, consider the taxonomy of topics previously described in which top-level nodes correspond to high-level topics such as "politics" or "sports", while lower-level nodes correspond to more specific topics such as "the Republican Convention" (under politics), or "curling" (under sports).

The corresponding lattice has an element for each node of the tree, plus a new node ⊥ (as the root fulfills the requirement for T). The meet of a set of nodes is the largest node contained in all nodes of the set, and the join is the smallest node that contains all nodes in the set. A pairwise-disjoint collection of a hierarchical dimension then corresponds to an antichain of the corresponding tree.

If a metric is required for this dimension, the metric is distance in the tree. This can easily be extended to include weighted distance, in which each edge of the tree is given a length.

For convenience, system 10 uses specialized notation for hierarchical dimensions, as follows. Let T be a tree corresponding to some hierarchical dimension. There is a one-to-one correspondence between the nodes of T and the elements of the lattice; tree nodes are considered for convenience. Let root(T) be the root of T, and #(T) be the number of nodes in T. If a is an internal node with degree Δ in T, system 10 uses $a_1, \ldots, a_\Delta$ to denote the Δ children of a. Let depth(T) be the depth of T.

The query engine implements a basic $(f, \circ)$ dynamic programming algorithm for hierarchical and numerical dimensions and provides a framework for computing sequential and factored pairwise-disjoint collections for arbitrary collections of dimensions. The term $(f, \circ)$ is further referenced herein as an f/circ pair. The query engine further implements more efficient algorithms for max-monotone pairwise-disjoint collections and for sum-additive pairwise-disjoint collections. An optimizer selects the appropriate algorithm at each step. System 10 further comprises implementations of the six query types described below.

Figure 4:
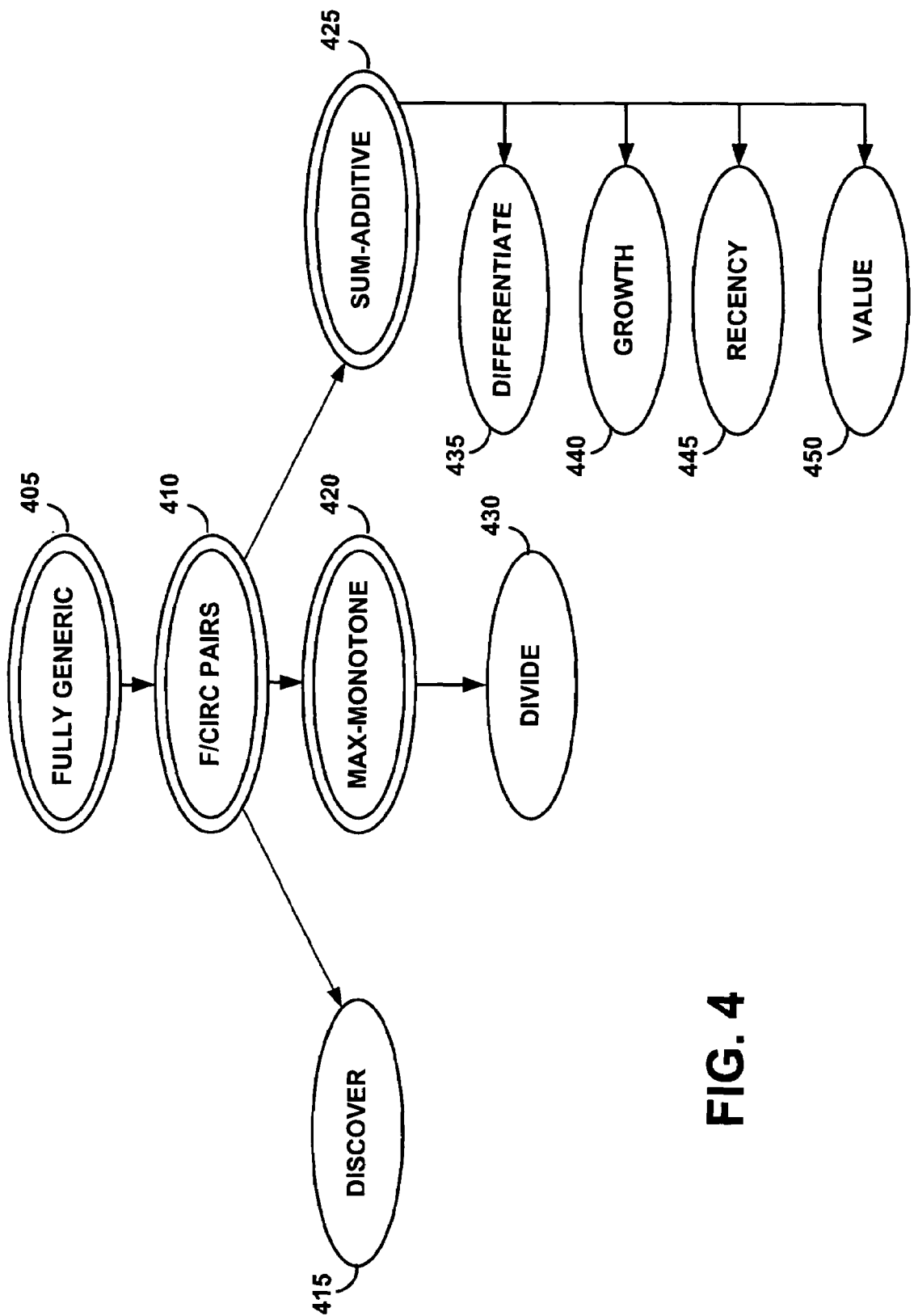
FIG. 4 is a diagram illustrating query types of the multi-structural query system of FIGS. 1 and 2.

FIG. 4 illustrates algorithms and query types of system 10. A fully generic algorithm 405 locates and evaluates a desirable set of candidates for a collection of regions in a general sense. An f/circ pairs algorithm 410 is more specific and more efficient in locating and evaluating a desirable set of candidates for a collection of regions. A discover query type 415 is a type of query using the f/circ pairs algorithm 410. A max-monotone algorithm 420 and a sum-additive algorithm 425 are subclasses of the f/circ pairs algorithm 410. A divide query type 430 is a type of query using the max-monotone algorithm 420. A differentiate query type 435, a growth query type 440, a recency query type 445, and a value query type 450 are each a type of query using the sum-additive algorithm 425.

An exemplary set of dimensions for a corpus of documents derived from a crawl of the WWW is illustrated in Table 1. The "persons" dimension includes subcategories such as "corporate leaders" and "popular figures". The leaves of this dimension are names of specific people. "Politicians" is a subtree of the "person" taxonomy that is used as a separate dimension. It includes groups like "US Executives" and "Heads of State". The leaves of the "locations" tree are geographical locations throughout the globe. "Media" is a taxonomy of source types and includes a large set of newspapers and magazines organized by categories such as "college" and "US Top 100". To calculate the "StarRating" value, the mentions of movie stars on each document are counted. Similarly, the "Europe" dimension is a count of mentions of European locations. The "date" dimension is the date the page was created for those documents where a date is confidently detected.

TABLE 1

An exemplary set of dimensions for a corpus of documents derived from a crawl of the WWW.

| Name | Type | Size |
| --- | --- | --- |
| Persons | Hierarchical | 165 M |
| Politicians | Hierarchical | 7.4 M |
| Locations | Hierarchical | 177 M |
| Media | Hierarchical | 96 M |
| StarRating | Numerical | 62 M |
| Europe | Numerical | 11 M |
| Date | Numerical | 1.5 B |
| Crawl Date | Numerical | 3.8 B |

The basic query structure of system 10 is as follows:

Given: Dimensions $D' \subseteq D$, data objects $X' \subseteq X$, score function $f: 2^x \times D \to R$, an associative binary combination operator $\circ: R \times R \to R$, and integer k. (R denotes the reals.)

Find: pairwise-disjoint collection $\{(l_1, \ldots l_k\} \subseteq MD(D')$ such that $g(X'; l_1, \ldots, l_k) = f(X'; l_1) \circ \ldots \circ f(X'; l_k)$ is maximized over all such pairwise-disjoint collections.

A particular fixed pair $(f, \circ)$ is referenced as a query type. A simple example of $(f, \circ)$ is $f(A;l) = \#(A|_l)$ and $\circ = +$. The basic algorithms for specific optimization problems immediately yield efficient algorithms for single numerical and hierarchical dimensions for all query types $(f, \circ)$ that can be evaluated efficiently. Specifically, assuming unit cost for the evaluations of $f$ and $\circ$, the algorithms (i.e., divide query type 430 and discover query type 415 discussed below) can be easily modified to obtain an $O(n^2k)$ time algorithm for a single numerical dimension and an $O(nk^2)$ time algorithm for single hierarchical dimension. While the case of hierarchical dimensions can be considered well solved, the solution for numerical dimensions is too expensive, for example, when considering hourly sales data over large periods of time.

In general, an objective function $g(A; l_1, \ldots, l_k)$ need not admit a decomposition into $f$ and $\circ$; an example is $g(A; l_1, \ldots, l_k) = \#(\cup_i A|_{l_i})$. Fortunately, a large class of optimization problems admits such a decomposition, and motivates the search for efficient algorithms for various query types $(f, \circ)$ depending on easily identifiable properties of the function $f$ and the $\circ$ operation.

A score function $f$ is monotone if $f(A;l) \leq f(B;l)$ for all sets $A \subseteq B \subseteq X$ and every $l \in D$. Similarly, a score function is additive if the following conditions are met:

There is a function h: $2^x \to R$ such that $f(A;l) = h(A|_l)$ for every $l \in D$; and For all A, $B \subseteq X$ such that $f(A \cup B) = f(A) + f(B)$ when A ∩ B = Ø.

An example of an additive score function is $f(A;l) = \#(A|_l)$. Query types $(f, \circ)$ are max-monotone if $\circ$ is max and $f$ monotone. Likewise, $(f, \circ)$ is sum-additive if $\circ$ is + and $f$ is additive.

The sum-additive query type computes sequential pairwise-disjoint collections over any set of dimensions in time linear in the input number of documents. The algorithm of the sum-additive query type is based on a k-maximum subinterval problem. Informally, the problem is to find k non-overlapping intervals in a sequence of real numbers whose sum is maximized. More formally, given a sequence of $x[1], \ldots, x[n]$ real numbers and a positive integer k, find a set of at most k non-overlapping sub-intervals $I_i$ such that $$\sum_i S(l_i)$$

is maximized. Here, $$\sum_i S(l_i) = \sum_{\ell \in l} x(\ell).$$

The problem of finding optimal pairwise-disjoint collections for a sum-additive query type over numerical dimensions can be cast as a maximum subinterval problem. Given X', a numerical dimension, and an integer k, consider the instance of the k-maximum subinterval problem with $x[i] = f(|r_i, r_i|)$, where $f(\emptyset) = 0$. Since $f$ is additive, it is easy to see that the quality of the solution to the k-maximum subinterval problem is exactly the quality of the resulting pairwise-disjoint collection.

System 10 comprises an algorithm to solve the maximum subinterval problem. Without loss of generality, the given input sequence $x[1], \ldots, x[n]$ is assumed to be sign$(x[i]) \neq$ sign$(x[i+1])$ for $i=1, \ldots, n-1$. This can be realized by replacing each consecutive sequence of positive (resp. negative) values by their sum. It is easy to see that the optimal solution is unchanged under this simplification. Similarly, it is assumed that $x[i] \neq 0$ for all $i=1, \ldots, n$.

For k=1, there is a simple linear-time dynamic programming algorithm (folklore) for this problem. The algorithm is the following. Perform a single scan through the sequence $x[1], \ldots, x[n]$ from left to right, at each step maintaining the best interval seen so far. The scan is split into phases, as follows. Let i be the left end of the current phase. System 10 begins scanning elements $x[j]$ where $\geq i$, keeping track of $S([i,j])$. If $S([i,j])$ is negative, end the current phase and begin a new phase with j+1 as the left end. Otherwise, if $S([i,j])$ is greater than the current best interval, update the current best interval. At the end, output the interval with the maximum sum that was encountered.

This algorithm runs in linear time. Consider points $j_1$, the start of some phase; $j_2$, within that phase; and $j_3$, the last point of the phase, and assume that point $j_3+1$ exists. Then $S([j_1, j_2-1])$ is non-negative, and $S([j_1, j_3])$ is negative, by construction; thus, $S([j_2, j_3])$ must be negative. If the optimal solution begins at $j_2$ and ends in another phase, then it may be replaced by another solution beginning at $j_3+1$, removing $S([j_2,j_3])$ and hence improving its overall value, a contradiction. Thus, the optimal interval will not cross a phase boundary.

By a similar argument, for any phase (including the last one), if the optimal solution begins at $j_2$ and ends within the same phase, its left endpoint may be extended to $j_1$, improving its value by $S([j_1, j_2-1])$, which is non-negative. Consequently, there must exist an optimal interval that begins at a phase boundary, and does not cross a phase boundary; the algorithm considers all such intervals.

By negating all values in the sequence, the same algorithm may also be applied to find the subinterval with the minimum sum. By the alternating property, the sequence must contain negative values, and hence this sum is always negative.

For general k, there is a simple quadratic-time dynamic programming algorithm to find the optimal solution. Let $P(i, k)$ be the optimal value produced by selecting k non-overlapping intervals of the sequence $x[1], \ldots, x[i]$. Let $B([j', i])$ be the value of the subinterval of $[j',i]$ with maximum sum; $B([1,i])$ may be computed for all i by a single pass of the optimal k=1 algorithm above, so all B values may be computed in time $O(n^2)$. The optimal value for k intervals may then be computed by the following recurrence:

$$P(i, k) = \max_{j'<i}\{P(j' - 1, k - 1) + B([j', i])\}.$$

This algorithm takes $O(n^2k)$ time.

System 10 comprises an $O(n^2k)$ algorithm for the k-maximum subinterval problem.

System 10 further provides for a more efficient algorithm for sum-additive $(f, \circ)$ pairs over numerical dimensions as follows:

Let C be the subinterval of $[1, n]$ with the maximum sum, as determined by the k=1 algorithm above. Let L, R be the largest subintervals in $[1, n]$ to the left and right of C respectively. Let $C_2$ be the subinterval of C with the minimum sum, again as determined by the k=1 algorithm. Let $C_1$ and $C_3$ be the largest subintervals in C to the left and right of $C_2$ respectively. This results in a decomposition of the original interval into five subintervals on a line.

The following lemma allows a recursive decomposition of the line.

Lemma 1: There is an optimal solution such that:

Every interval of the optimal solution is either C, or lies entirely within some interval of the 5-way decomposition, and the optimal solution either contains C or contains an interval in both $C_1$ and $C_3$.

Theorem 1: The k-maximum subinterval problem can be solved in time $O(\min\{n^2k, \max\{nk, k5^k\}\})$ Proof: Given $x[1], \ldots, x[n]$, consider a 5-ary tree T with the following properties: each node of T corresponds to an interval; the root of T corresponds to the interval $[1, n]$; and, the five children of a node correspond to the five intervals resulting from applying the 5-way decomposition defined above to the interval of the parent. Define the "heavy interval" of a node as the max-sum single interval that lies within the interval corresponding to the node, and define the "weight" $w(a)$ of the node a to be the value of the heavy interval.

Lemma 2: There is an optimal solution in which every interval is the heavy interval of some node of the tree T.

Proof: Lemma 2 shows that there is an optimal solution that contains at least one interval in C; thus, L and R must have no more than k-1 intervals. Lemma 2 further shows that in this constructed optimal solution, if there are two or more intervals within C, there must be at least one interval in each of $C_1$ and $C_3$. Therefore, there is a solution in which none of the five intervals of the decomposition contains more than k-1 intervals in this optimal solution.

Inductively, after j levels of decomposition, there is an optimal solution in which no interval in the 5-way decomposition contains more than k-j intervals in the optimal solution. Therefore, after k levels of decomposition, there is an optimal solution in which each interval of the decomposition contains no more than one optimal interval.

Consider such an optimal solution and any single interval I of the solution. There is some node of T that contains I and the interval corresponding to the node in the tree intersects no other interval of the optimal solution. Replace I in the optimal solution by the heavy interval of that node; this can only improve the solution.

Thus, finding the highest-score set of k non-overlapping heavy intervals from the tree yields an optimal solution. This corresponds to finding k incomparable nodes of the tree (that is, k nodes such that no pair lie on a path from the root to any leaf) of maximum total weight. This is accomplished by dynamic programming, as follows. First, the tree is modified to make it binary. Each node has five children, so replace the tree with a depth-3 binary subtree. Assign one child each to five of the eight leaves of the subtree and weight $-\infty$ to all other nodes, both leaf and internal, of the subtree. Any optimal solution of k incomparable nodes in the tree will not contain one of these new nodes, so a solution in this new tree can be mapped to a solution of equivalent cost in the original tree.

Let $B(a,k)$ be an optimal way to choose k nodes of the tree rooted at a, with children $a_1, a_2$, such that no two nodes lie on a root-leaf path. B may be computed by the following recurrence:

$$B(a, k) = \max\left\{w(a), \max_{k'=0}^{k}(B(a_1, k') + B(a_2, k - k'))\right\}$$

At each node in the tree, the time taken to compute $B(a,k)$ is $O(k)$. Since the number of nodes in the tree is at most $\min\{nk, 5^k\}$, the dynamic program runs in time $O(k, \min\{nk, k5^k\})$.

It remains to consider the time to compute the tree. At each level of the tree, the intervals assigned to nodes at that level represent a partition of the original n points. Each interval of the partition is processed in linear time, to compute the next-level decomposition, resulting in $O(n)$ time overall to process each level. Thus, the total time to compute the tree is $O(nk)$. So, the algorithm runs in time $O(\min\{nk^2, \max\{nk, k5^k\}\})$.

System 10 comprises the following query types shown in FIG. 4: divide, differentiate, discover, growth, recency, and value. A query specification comprises X, D', and $(f, \circ)$. For each query, the subset $X' \subseteq X$ is specified according to a simple scheme: any restriction that uses the dimensions of the multi-structural database is allowable (for instance, all documents mentioning a location in Europe that were crawled in 2003), and these queries may be further restricted by requiring that a certain keyword also appear on the page, for instance, the keyword "tsunami." In the following queries, X' is specified by giving a simple string such as "Geo:Europe, people:Mel Gibson, key:Iraq," that may be read as all the documents that mention a European location, also mention the person Mel Gibson, and contain the keyword Iraq.

In the following description of individual $(f,\circ)$ pairs, $\circ$ is either addition or min. The definition of $f$ is typically more complex. The following discussion describes how $f$ evaluates a particular element of MD(D') with respect to a particular X'.

A divide query type 430 seeks to determine how a set of objects is distributed across a particular set of dimensions. The goal of the divide query type 430 is to return a small pairwise-disjoint collections in which the documents are divided as evenly as possible among the elements of the pairwise-disjoint collections with respect to the set of dimensions; thus, the divide query type 430 provides a concise summary of the data. For example, a divide operation with respect to geography, where the goal is to partition into ten approximately equal-sized pieces, may show that 11 of documents come from North America, 9 come from Western Europe, and so on.

The divide query type 430 finds a pairwise-disjoint collection that divides X' into roughly equal sized pieces, generating a high-level understanding of where the mass of the data lies with respect to the selected multi-dimension. A divide query type 430 requests a pairwise-disjoint collection $H=\{h_1, \ldots, h_k\}$ that is complete (i.e., contains all the documents of X') and that minimizes, rather than maximizes, $f(h_1)\circ \ldots f(h_k)$. The term $f$ represents the number of documents of X' that appear at element l of the multi-dimension:

$$f(X',l)=\#(X'''|_l)$$

The combine function is min. Thus, a pairwise-disjoint collection $H=\{h_1, \ldots, h_k\}$ is given a score $f_{(h1)}\circ \ldots f(h_k)=\max\{f(h_1), \ldots, f(h_k)\}$. The score of a pairwise-disjoint collection is therefore the size of the largest node, and the formulation finds the pairwise-disjoint collection that minimizes the largest node, giving a balanced representation of the content of the documents. This is max-monotone. An exemplary set of queries using the divide query type 430 is illustrated in Table 2.

TABLE 2

An exemplary set of queries using the divide query type 430.

| Name | X' | D' |
|---|---|---|
| Q1 | Media | Politicians |
| Q2 | Movie Stars | Time |
| Q3 | Source | time, Geography |
| Q4 | People | Organizations, Geography |
| Q5 | key: iraq | time, Geography, People |

Table 2 is read as follows. Query Q2, for example, is defined for the divide query type 430. Query Q2 therefore employs that $(f,\circ)$ pair. The set X' on which the query is called is all documents that mention any movie star. The set D' of dimensions on which the pairwise-disjoint collection is constructed is a singleton set containing only the time dimensions.

The differentiate query type 435 allows a user to compare different document sets with respect to certain dimensions. For example, a user can observe that there are many more blog entries in July than the rest of the year, and can employ the differentiate operation to determine how particular topics or geographies explain the spike. Thus, the differentiate operation enables a user to find "surprises" in data.

The differentiate query type 435 returns nodes for which a larger relative fraction of the documents of X' appear than would be expected, given the statistics of some background set $B \subseteq X$. Thus, $$f_B(X',l) = \frac{\#(X'|_l)}{\#(X')} - \frac{\#(B|_l)}{\#(B)}.$$

The combine function is addition. The differentiate query type 435 is sum-additive. An exemplary set of queries using the differentiate query type 435 is illustrated in Table 3.

TABLE 3

An exemplary set of queries using the differentiate query type 435.

| Name | X' | D' |
|---|---|---|
| Q6 | key: coconuts | Time |
| Q7 | People: Mel Gibson | Organization |
| Q8 | People: George Bush | crawlDate, Geography |
| Q9 | People: Mel Gibson | People, Geography |
| Q10 | People | Organizations Geography, time |

The discover query type 415 breaks up a document set so that an internal pattern becomes visible. The discover operation segments the data using one set of dimensions such that the resulting segments are cohesive and well-separated according to another set of dimensions. For example, a user may ask if there is a way to break up newspaper articles by topic so that a strong geographic bias emerges. Thus, the discover operation enables a user to find interesting "regions" and structure in the data.

The discover query type 415 returns nodes of the multi-dimensions that are distinct with respect to a separate set $M \subseteq D$ of measurement dimensions. Distinct means that documents of X' located at l are cohesive according to the metric implied by M, and that these documents are well-separated from the other documents of X', again according to the metric implied by M. The term $f(X',l)$ is defined as:

$$f(X', l) = \frac{\sum_{x \in X'|_l, y \in X' \setminus (X'|_l)} d_M(x,y)}{\#(X'|_l)\#(X' \setminus (X'|_l))} - \gamma \frac{\sum_{x,y \in X'|_l} d_M(x,y)}{\#(X'|_l)^2}$$

The combine function is sum. The term $\gamma$ is a parameter of the query type that trades off the cohesion of the documents at l against their separation from other documents. An exemplary set of queries using the discover query type 415 is illustrated in Table 4.

TABLE 4

An exemplary set of queries using the discover query type 415.

| Name | X' | D' | Measure |
|---|---|---|---|
| Q11 | All | People | Time |
| Q12 | All | People | Geography |
| Q13 | All | Politicians | Organizations Geography |
| Q14 | key: grammys | People | time Organizations |
| Q15 | key: tsunami | Geography | time Organizations People |

A growth query type 440 finds regions of most rapid growth that is useful for example in finding regions of rapid growth of a stock. The growth query type 440 is defined when D' is a single numerical dimension. The base elements of the lattice are assumed to be a partition of the numerical dimension into fixed-width intervals such as days or weeks, and all other intervals are assumed to be aligned with these base intervals. The growth of base interval i, g(i), is defined as $\frac{1+\#(X'|_i)}{1+\#(X'|_{i-1})}$. Then:

$$f(X', \ell) = \sum_{i \in \ell} \log(g(i))$$

and the combine function is addition. The growth query type 440 is sum-additive. An exemplary set of queries using growth query type 440 is illustrated in Table 5.

TABLE 5

An exemplary set of queries using the growth query type 440.

| Name | X' | D' |
|---|---|---|
| Q16 | People: Mel Gibson | Time |
| Q17 | People: George Bush, Geography: Middle East | Time |
| Q18 | Media, Organizations | Time |

The recency query type 445 finds, for example, media types that have published more content on a particular topic during the last few weeks than their history would warrant. The recency query type 445 scores nodes of l according to a ratio of the density of documents appearing at the node during some recent interval RI compared to some earlier interval EI of some numerical dimension T (typically a time dimension). Thus, $$f(X', \ell) = \frac{\#(X'|_{\ell,RI})}{\#(X'|_{\ell,EI})}$$

and the combine function is addition. The recency query type 445 is sum-additive. An exemplary set of queries using recency query type 445 is illustrated in Table 6.

TABLE 6

An exemplary set of queries using the recency query type 445.

| Name | X' | D' |
|---|---|---|
| Q19 | Media | Politicians |
| Q20 | Geography | time |
| Q21 | People | Geography, Organization |
| Q22 | Movie Stars | Politicians, time |
| Q23 | Media | Geography, Politicians, time |

The value query type 450 applies a quality score to each individual page in a collection. Positive values mean that the page has positive quality and adds overall to the measure; negative values mean the opposite. The quality of a collection is the sum of the quality of the pages in the collection. An exemplary rating is a star rating, which is the number of movie star entities mentioned on the page minus some threshold value. Another exemplary rating is Europe affinity, which is the number of references to any European location on the page, minus some threshold value. If the score of a page x is given by s(x) then:

$$f_s(X', \ell) = \sum_{x \in X'|_\ell} s(x)$$

and ∘ is addition. The value query type 450 is sum-additive. An exemplary set of queries using the value query type 450 is illustrated in Table 7. Table 7 comprises X' and D', and further specifies the particular quality score used.

TABLE 7

An exemplary set of queries using the value query type 450.

| Name | X' | Quality score | D' |
|---|---|---|---|
| Q24 | All | Star Rating | People |
| Q25 | Media | Europe aff. | time |
| Q26 | People | Star Rating | Organizations Geography |
| Q27 | All | Europe aff. | time, People |
| Q28 | Politicians | Star Rating | time, People Geography |

The schema of system 10 is a multi-dimensional lattice of attributes. This schema unifies and extends OLAP analytical models, allowing a succinct definition of the set of "allowable restrictions" of a collection of data objects. Namely, each element of the lattice defines a permissible restriction of the data objects. In an example of newspaper articles, the schema contains two attributes for each article: relevant locations and publication date for the article. The attribute, geography, admits a natural hierarchy (continents, countries, cities, etc.) where natural restrictions correspond to nodes of the hierarchy. The attribute, date, is a numerical attribute; natural restrictions are obtained by considering time intervals that then form a lattice. Thus, "articles relevant to Europe from the first half of 2003" is an example of a multi-dimensional restriction of the collections obtained by specifying a restriction along each dimension.

A pairwise-disjoint collection is a set of restrictions (lattice elements) that are conceptually non-overlapping in the sense that every pair in a pairwise-disjoint collection is disjoint in at least one dimension. The restrictions "articles about Europe from the first half of 2003," "articles about California from June 2004," and "articles about France dated Jun. 17, 2004-Sep. 23, 2004" are pairwise-disjoint. Indeed, the initial two are disjoint in both the geography and date dimensions; the latter two are disjoint in the geography dimension even though they overlap in the date dimension; also, the first and the third restrictions are disjoint in the date dimension even though France is a descendant of Europe in the geography hierarchy. Data objects may possess one or more attributes within a dimension (e.g., an article that mentions California and Spain); consequently, conceptually disjoint sets may not be disjoint in the set of objects they contain.

The data in a multi-structural database comprise a collection of data objects, together with a membership relation that associates data objects with lattice elements; i.e., which of the attributes from the allowed family of attributes each data object possesses. The membership relation for the newspaper articles specifies, for each article, the most specific locations of relevance to the newspaper article (i.e., leaves corresponding to cities, internal nodes corresponding to countries, etc., in the geography hierarchy), and the calendar publication date of the newspaper article (i.e., singleton intervals in the date dimension).

System 10 comprises objective functions (referenced as query types) in the following classes: the max-monotone algorithm 420 and the sum-additive algorithm 425. An objective of the max-monotone algorithm 420 is to minimize a maximum of a monotone function applied to each element in the pairwise-disjoint collections. An objective of the sum-additive algorithm 425 is to maximize (or minimize) a sum of an additive function applied to each element in the pairwise-disjoint collections. An additive function is one that satisfies $f(A \cup B) = f(A) + f(B)$ whenever $A \cap B = \emptyset$.

The case of functions of the sum-additive algorithm 425 arises very naturally in several contexts, especially for numerical dimensions (time, salary, sales volume), where one seeks to find k intervals of highest total value of a function that is naturally additive over disjoint sub-intervals (number of articles, wages paid, cans of beer sold). Differentiate and discover are of this kind; a typical differentiate operation asks to find the k disjoint time intervals that have the highest total contrast in the number of articles about Europe and articles about Canada.

Algorithms for the analytical operations can be extended to yield exact algorithms for arbitrary objective functions of the sum-additive algorithm 425 that run in time $O(nk^2)$ on hierarchical dimensions and time $O(n^2k)$ on numerical dimensions. System 10 comprises an exact optimization algorithm for objective functions of the sum-additive algorithm 425 that runs in time $O(nk^2)$ on both hierarchical and numerical dimensions. This is an order-of-magnitude improvement over the $O(n^2k)$ algorithm for numerical dimensions in conventional systems, considering that in typical (specifically, interactive) applications, n is very large (billions or trillions), but k is usually quite small (e.g., 10), often limited by screen size for the display of results. System 10 comprises an efficient algorithm for the following basic combinatorial problem: given a sequence of integers, find k non-overlapping contiguous subsequences whose sum is maximal.

System 10 randomly samples data objects corresponding to restrictions, further providing and efficient system. Namely, if the objective function is of the form $g(A_1, \ldots, A_k) = f(A_1) \circ f(A_2) \circ \ldots \circ f(A_k)$, one may ask if it is possible to obtain an unbiased estimator for g, given the ability to produce unbiased estimators for $f(\cdot)$. For example, $g(A_1, \ldots, A_k) = \#(A_1) + \ldots + \#(A_k)$ (where $\#(\cdot)$ denotes cardinality) admits such estimators, while $g(A_1, \ldots, A_k) = \#(A_1 \cup \ldots \cup A_k)$ does not (at least in any obvious way). This feature is important to system 10 since, when dealing with massive data sets, it may be too expensive to even scan all the data objects necessary to compute the "quality" of various restrictions. For this reason, system 10 relies on randomly sampling data objects corresponding to each of the restrictions.

System 10 comprises dynamic programming algorithms to compute pairwise-disjoint collections over a single numerical or hierarchical dimension. For operations query types divide, differentiate, and discover, a weight can be defined for each element of the multi-dimension MD(D') such that the quality of a resulting pairwise-disjoint collection can be written as the max (for divide query type 430) or sum (for differentiate query type 435 and discover query type 415) over all elements of the weight of the element. System 10 explicitly computes these weights.

Theorem 2: Given a single numerical dimension with n points, divide query type 430, differentiate query type 435, and discover query type 415 can be solved exactly in polynomial time.

Proof: Let $v_1, \ldots, v_n$ be the distinct values of the numerical dimension, in ascending order. The dynamic program is defined over the indices $1, \ldots, n$. For each positive integer k'≦k and each index i, system 10 considers all solutions that place k' non-overlapping intervals in a range from 1 ... i, with a last interval ending exactly at i. System 10 computes the optimal value C(k',i) by considering all possible such last intervals. A dynamic program for each of the operations is described below.

For the divide query type 430, system 10 sets a weight w(a, b) of an interval [a, b] to be $w(a,b) = \#(X'|_{[a,b]})$. The dynamic program is given by:

$$C(k', i) = \min_{j=1}^{i-1} \{\max\{C(k'-1, j), w(j+1, i)\}\}.$$

For the discover query type 415, system 10 sets the weight to be $w(a,b) = \eta(M, X'; [a,b])$, and the corresponding dynamic program is given by $$C(k', i) = \max_{j=1}^{i-1} \{C(k'-1, j) + w(j+1, i)\}.$$

For the differentiate query type 435, system 10 similarly sets $w(a,b) = \mu(X'|_{[a,b]}; F, B)$ and uses the same dynamic program as the discover query type 415. For the divide query type 430 and the differentiate query type 435, the corresponding weights can be computed in $O(\max\{\#(X'), n^2\})$ time and for the discover query type 415, the weights can be computed in $\tilde{O}(\max\{\#(X'), n^2\} \cdot \#(M))$ time. Once the weights are computed, a pairwise-disjoint collection using budget exactly k is C(k, n); the running time of the dynamic program is therefore $O(kn^2)$. The dynamic program for divide can be used more generally for any max-monotone query; differentiate for any sum-additive query; and discover for any f/circ pair. These algorithms are defined for illustration purpose only, for a numerical dimension.

The following theorem is a simple approximation algorithm for the divide query type 430. This theorem is based on a greedy algorithm that requires only a single scan of the data.

Theorem 3: Given a single numerical dimension with n points, the divide query type 430 can be efficiently approximated to within a factor of 2 in time O(n).

System 10 comprises algorithms for a single hierarchical dimension.

Theorem 4: Given a single hierarchical dimension implied by a tree T, the divide query type 430, the differentiate query type 435, and the discover query type 415 can be solved exactly in polynomial time.

Proof: Let T be the tree implied by the hierarchical dimension. A dynamic programming algorithm is driven by the following rule. Let a=root(T) and let $a_1, \ldots, a_\Delta$ be the children of a. A pairwise-disjoint collection of size at most k in T is either a itself, in which case none of the descendants of a can be included in the pairwise-disjoint collection, or is the union of the pairwise-disjoint collections $C_1, \ldots, C_\Delta$ of the subtrees rooted at $a_1, \ldots, a_\Delta$ respectively with the constraint that $$\sum_{i=1}^{\Delta} |C_i| \leq k.$$

One implementation of this rule would involve partitioning k into Δ pieces in all possible ways and solving the dynamic program for each of the subtrees.

System 10 generates a binary tree T' from T with the property that a desirable pairwise-disjoint collection in T' corresponds to a desirable pairwise-disjoint collection in T. System 10 constructs T' as follows. Each node a of T with more than two children $a_1, \ldots, a_\Delta$ is replaced by a binary tree of depth at most $\log(\Delta)$ with leaves $a_1, \ldots, a_\Delta$. The weights of $a, a_1, \ldots, a_\Delta$ are copied over from T and the weights of the internal nodes created during this process are set to $\infty$ for the divide query type 430, and $-\infty$ for the differentiate query type 435 and the discover query type 415. The construction is now repeated on $a_1, \ldots, a_\Delta$ to yield a weighted tree T'. A desirable pairwise-disjoint collection in T' is the same as a desirable pairwise-disjoint collection in T. Also, the tree size at most doubles, i.e., $\#(T') \leq 2 \cdot \#T$.

Since T' is binary, a dynamic programming algorithm to compute a desirable pairwise-disjoint collection in T' is more efficient. For each operation, let w be a function assigning a weight to each node of T', as shown in the Table 8.

TABLE 8

Functions assigning weight to each node of T' for divide query type 430, differentiate query type 435, and discover query type 415.

| | |
|---|---|
| DIVIDE | $\omega(a) = \#(X'\|_a)$ |
| DIFFERENTIATE | $\omega(a) = \mu(a; F, B)$ |
| DISCOVER | $\omega(a) = \eta(M, X'; a)$ |

System 10 computes an optimal solution using dynamic programming, as follows. Let $C(k', a)$ be a score of a desirable choice of k' incomparable nodes in a subtree rooted at node a of T'. System 10 can fill in the entries of C using the following update rule:

$$C(k', a) = \begin{cases} w(a) & k' = 1 \\ \text{worstval} & k' > 1 \text{ and } a \text{ a leaf} \\ \text{bestsplit}(k', a) & \text{otherwise} \end{cases}$$

where worstval and bestsplit are dependent on the query type.

In the divide query type 430, system 10 requires a complete pairwise-disjoint collection. Furthermore, system 10 is required to minimize the weight of the maximum node. Consequently, system 10 sets worstval=$\infty$ and defines bestsplit as follows:

$$\text{bestsplit}(k', a) = \min_{k''=1}^{k'-1} \{\max\{C(k'', a_1), C(k' - k'', a_2)\}\}.$$

For the differentiate query type 435 and the discover query type 415, a complete pairwise-disjoint collection is not required and the sum of the weights of all nodes in the pairwise-disjoint collection are maximized. Consequently, system 10 sets worstval=$-\infty$ and defines bestsplit as follows:

$$\text{bestsplit}(k', a) = \max_{k''=0}^{k'} \{C(k'', a_1) + C(k' - k'', a_2)\}.$$

The bounds for the min or max operator in the two variants of bestsplit range from 1 to k'−1 in the case of the divide query type 430, and from 0 to k' for the other query types. This implements the requirement that divide return a complete pairwise-disjoint collection by requiring that at least one unit of budget is sent to each child; the general pairwise-disjoint collection required for the differentiate query type 435 and the discover query type 415 allows zero units of budget to be sent to either child.

For the divide query type 430 and the differentiate query type 435, it can be shown that the weights can be computed in $O(\max\{\#(X') \cdot \text{depth}(T), \#(T)\})$ time and for the discover query type 415, the weights can be computed in $$\max\{\#(X') \cdot \text{depth}(T), \#(M) \cdot \#(T) \cdot \max\{n, \#(T)\}\} \text{ time,}$$

where n is a maximum number of distinct points in any dimension of M and T is the largest tree in M. Once the weights are calculated, the dynamic program is computed for each k'=1, ..., k and for each $a \in T'$ and the resulting value is C(k,root(T')). For a given k', a, computing C(k',a) takes time k', which is at most k. Since the dynamic programming table is of size $k \cdot \#(T')$, the total running time is $k^2 \#(T') \leq 2k^2 \#(T)$. These algorithms are defined, for illustration purpose only, for a hierarchical dimension.

In a multi-dimension, each element may be easily and efficiently named in terms familiar to the user; for example, "European magazines" refers to an element of the multi-dimension over geography and media type. Consider a high-degree node such as "people" in a hierarchical dimension. If the budget k is smaller than the number of children of "people" then no complete pairwise-disjoint collection ever comprises a descendant of "people". However, it is straightforward to convey to the user a pairwise-disjoint collection of three elements: people/politicians, people/sports figures, and people/other. Such a pairwise-disjoint collection maintains a desirable property that all nodes can be efficiently named even though the meaning of people/other is defined only in the context of the remaining nodes of the pairwise-disjoint collection. Thus, for operations such as divide that require a complete pairwise-disjoint collection, it is desirable to allow "other" nodes as part of the solution. To allow this type of solution, system 10 therefore utilizes a query type augmented divide, an extension of divide query type 430 on a single hierarchical dimension.

To formalize the intuition behind "other" nodes, consider a hierarchical dimension rooted at "people", with children people/politicians, people/movie stars, and people/sports figures. Assume that "politicians" comprises William Clinton and George Bush, while sports figures and movie stars each contain numerous children. Consider the following candidate pairwise-disjoint collection: {people/sports figures, people/other}. Intuitively, this pairwise-disjoint collection is complete since all the politicians and the people/other node captures movie stars. Now consider instead the following pairwise-disjoint collection: {people/sports figures, people/politicians/William Clinton, people!other}. System 10 considers this pairwise-disjoint collection to be incomplete, since the inclusion of people/polticians/William Clinton means that the people/other node no longer covers "politicians", and hence people/politicians/George Bush is not covered. People/other refers only to subtrees of the "people" node that are not mentioned at all in the pairwise-disjoint collection. Thus, an "other" node of a given parent covers the entire subtree of a child of that parent if and only if no other elements of the same subtree are present in the pairwise-disjoint collection.

Formally, for any hierarchical dimension T, system 10 defines a new tree aug(T) by adding other nodes to T as follows:

$$\text{aug}(T) = T \cup \{t.\text{other} | t \text{ is an internal node of } T\}.$$

Each node t.other has parent t and no children. Thus, every internal node of T now contains an "other" child. In the following, a is an ancestor of t if a can be obtained by applying the parent function to t zero or more times; thus, t is considered to be its own ancestor. As discussed previously, the elements of T that are covered by a particular "other" node depend on the remainder of the pairwise-disjoint collection, so the behavior of an "other" node is defined only in a particular context.

For each h∈H, define $C_H(h)$ to be the nodes of T covered by h, with respect to H, as follows. If h is a node of T; that is, if h is not an "other" node, then $C_H(h)=\{t\in T | h$ is an ancestor of t$\}$. This is the traditional definition of the subtree rooted at h, and requires no changes due to the presence of "other" nodes. Now consider nodes h∈H such that h=p.other, so h is the other node corresponding to some node p. Then $C_H(h)=\{t\in T | $some child c of p is an ancestor of t, and c is not an ancestor of any element of H$\}$. This definition captures the idea that a subtree rooted at some child c of p is covered by p.other if and only if the subtree does not intersect H.

A subset $H \subseteq \text{aug}(T)$ is said to be a complete augmented pairwise-disjoint collection of T if and only if every leaf of T belongs to $C_H(h)$ for exactly one h∈H.

For every node h∈H, system 10 defines $$\#_H(X', h) = \#\left(\bigcup_{t \in C_H(h)} X'\bigg|_t\right).$$

Formally, the query type augmented divide is as follows:
Augmented divide(X, D; X', T, k)
Input: $X' \subseteq X$; hierarchical dimension T∈D; k∈$Z^\subset$
Output: A complete augmented pairwise-disjoint collection H of T of size k such that $$\max_{h \in H} \#_H(X', h)$$

is minimal over all such H.

Theorem 5: Given a single hierarchical dimension T, and access to an oracle that can provide $\#(X'|_t)$ in constant time for every t∈T, the augmented divide problem with budget k can be solved optimally in time O(k).

System 10 comprises algorithms for additional hierarchical and numerical dimensions. Let d be a number of dimensions. One result states that for a given ordering on the dimensions, optimal sequential pairwise-disjoint collections can be found for the divide query type 430, the differentiate query type 435, and the discover query type 415 in polynomial time. System 10 uses an iterative application of the optimal algorithm for the one-dimensional case.

Theorem 6: Given an ordering on the dimensions, the divide query type 430, the differentiate query type 435, and the discover query type 415 can be solved to find the optimal sequential pairwise-disjoint collection (under that ordering) in polynomial time.

Proof: For numerical dimensions, let C(X',i,x,k) be the score of a desirable pairwise-disjoint collection on documents X' over the last I dimensions of the sequence, over the interval (−∞, x), with budget k. The dynamic program is $$C(X', i, x, k) = \max_{\substack{y<x \\ 1 \le j \le k}} C(X', i, y, k-j) \circ C(X'|_{[y+1,x]}, i-1, \infty, j).$$

Here ∘ stands for max in the case of the divide query type 430, and for + in the case of the differentiate query type 435 and the discover query type 415. For hierarchical dimensions, let C(X',i,a,k) be the score of the a desirable pairwise-disjoint collection on documents X' over the last I dimensions of the sequence, over the subtree rooted at a, with budget k. System 10 assumes the tree has been made binary as in the proof of Theorem 4, and that $a_1$ and $a_2$ are the children of node a. Let $r_j$ be the root of a j-th dimension from the last, according to the ordering. Then, $$C(X', i, a, k) =$$
$$\min\{C(X'|_a, i-1, r_{j-1}, k) \min_{1 \le j < k} C(X', i, a_1, j) \circ C(X', i, a_2, k-j)\}.$$

Figure 5:
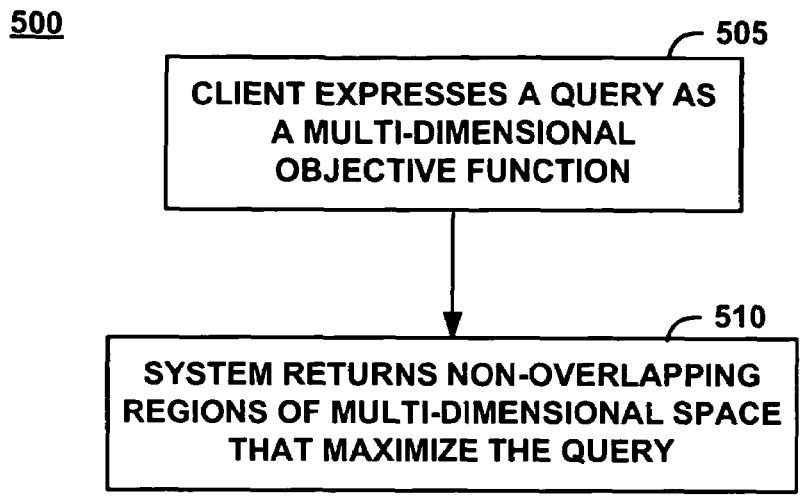
FIG. 5 is a process flow chart illustrating a method of operation of the multi-structural query system of FIGS. 1 and 2.

FIG. 5 illustrates a method 500 of system 10 in generating a query and returning non-overlapping regions. A client expresses a query as a multi-dimensional objective function (step 505). The client can be a human or an application. System 10 returns a non-overlapping region of multi-dimensional space that maximizes the query (step 510).

Figure 6:
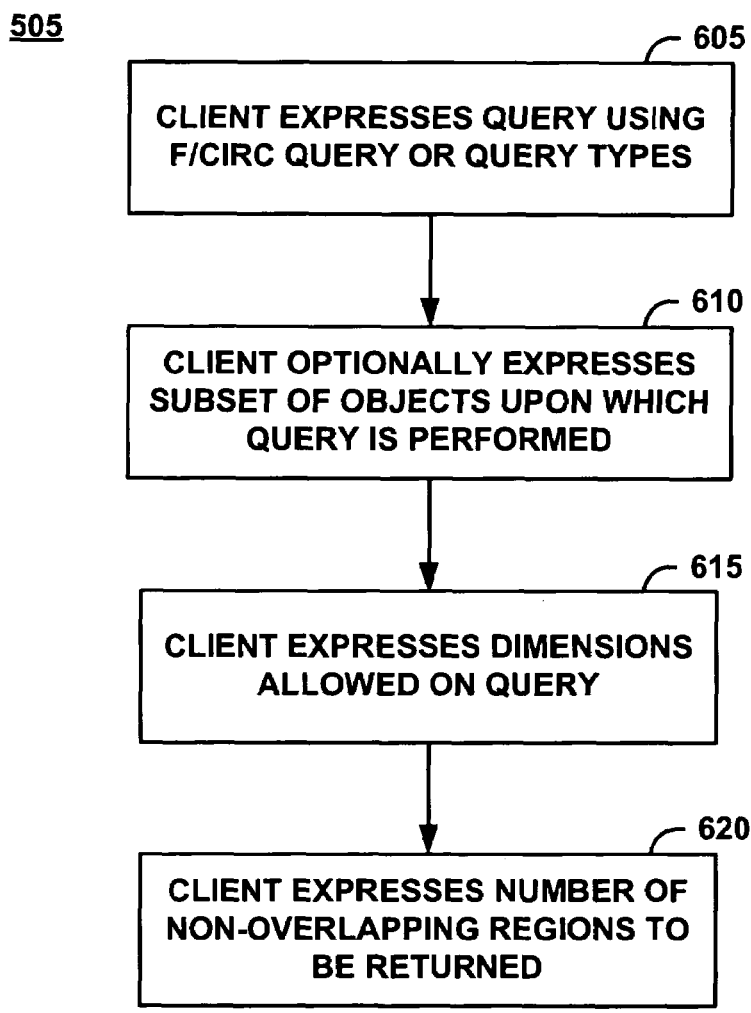
FIG. 6 is a process flow chart illustrating a method of operation of the multi-structural query system of FIGS. 1 and 2 in query expression.

FIG. 6 illustrates a method of system 10 in performing step 505. The client expresses a query using the f/circ query (f/circ pairs algorithm 410) or query types (step 605). Query types comprise the discover query type 415, the divide query type 430, the differentiate query type 435, the growth query type 440, the recency query type 445, and the value query type 450. As an option, the client expresses a subset of objects upon which the query is performed (step 610). The client expresses dimensions allowed on the query (step 615). The client expresses a number of non-overlapping regions to be returned (step 620).

Figure 7:
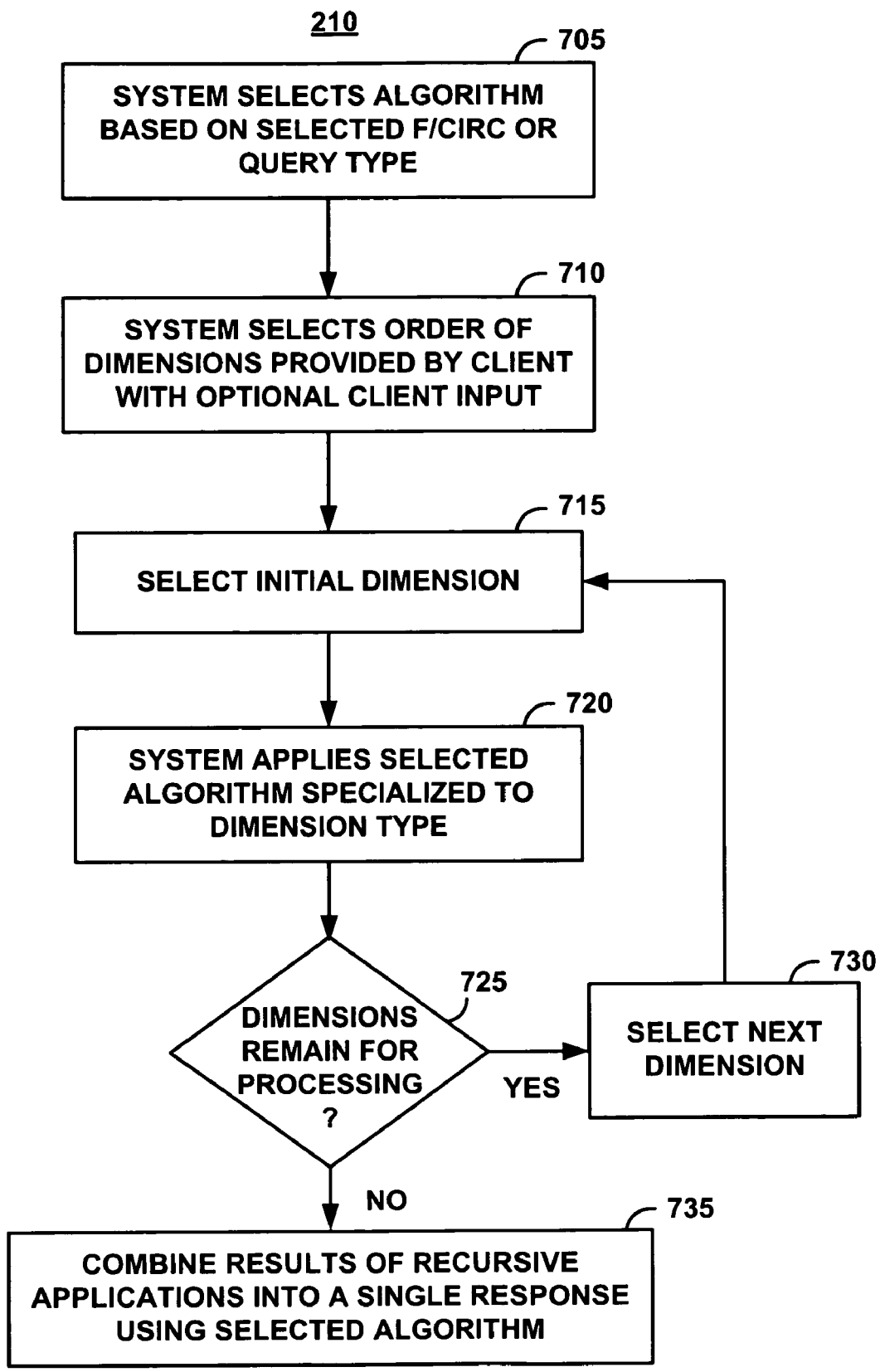
FIG. 7 is a process flow chart illustrating a method of operation of the multi-structural query system of FIGS. 1 and 2 in returning query results.

FIG. 7 illustrates a method of system 10 in performing step 510. System 10 selects an algorithm based on the selected f/circ query or query type selected in step 605 (step 705). The system selects an order of dimensions provided by the client with optional client input (step 710). The dimensions are used by system 10 to generate a sequential pairwise-disjoint collection.

System 10 selects an initial dimension for processing (step 715) and applies a selected algorithm specialized to the dimension type (step 720). System 10 determines whether additional dimensions remain for processing (decision step 725). If yes, system 10 selects a next dimension (step 730) and repeats step 715 through step 725. If no additional dimensions remain for processing, system 10 combines the results of these recursive applications into a single response using selected algorithm (step 735).

As an example, using documents as objects, a geography dimension and a media type dimension are defined for schema 215. The geography dimension and the media type dimension are hierarchical. The geography dimension comprises regions Americas, Europe, and Asia. Europe comprises regions France and Spain. The media type dimension comprises a print media category and personal media category. The print media category comprises newspapers and magazines. The personal media category comprises websites and blogs.

The client selects a query type (step 605). If the client is a human user, the client can, for example, select a query from a list. If the client is a machine, selection of the query type can be made, for example, programmatically. The user selects a subset of objects (step 610). In this example, the user specifies all objects. The user specifies dimensions (step 615) as geography and media type (all dimensions). The user specifies that 2 regions be returned (step 620).

System 10 considers the algorithm for the differentiate query type 435 (block 705) and chooses the sum-additive algorithm 425 because the differentiate query type 435 is sum-additive. System 1 0 selects an order of the dimensions (step 710) as the geography dimension followed by the media type dimension. System 10 selects the initial dimension (the geography dimension) (step 715) and applies the sum-additive algorithm 425 (step 720).

In step 720, system 10 considers each node of the geography dimension (for example, France) and applies the sum-additive algorithm 425 for the differentiate query type 435 to documents for France only, using the media type dimension. If additional dimensions had been specified, system 10 would further use the remaining dimensions except geography, which has already been restricted to France (decision step 725 and step 730). System 10 combines the results of these recursive applications into a single response using the sum-additive algorithm 425 for the differentiate query type 435.

System 10 applies the differentiate query type 435 to document from France only, using only media type. The desirable solution in France is, for example, magazines and websites. System 10 continues to explore the hierarchical tree representing the geography dimension, remembering the desirable results from France.

In this example, system 10 explored France, considered magazines, etc. System 10 also explored Spain and Europe. System 10 discovers that although Spain is part of Europe, blogs and magazines are distinct because they are non-overlapping.

It is to be understood that the specific embodiments of the invention that have been described are merely illustrative of certain applications of the principle of the present invention. Numerous modifications may be made to the system and method for performing a high-level multi-dimensional query on a multi-structural database described herein without departing from the spirit and scope of the present invention. While system 10 is described for illustration purposes only in terms of documents, it should be clear that the invention is applicable as well to, for example, any type of object. Furthermore, while the present invention is described for illustration purpose only in relation to the WWW, it should be clear that the invention is applicable as well to data derived, for example, from any source and accessed, for example, either locally or remotely.

What is claimed is:

1. A computer implemented method of performing a high-level multi-dimensional external fuzzy query on a multi-structural database, comprising:

receiving a set of objects and a set of dimensions, said set of dimensions being selected as at least one of the group consisting of: time, content type, geography, and topic;

formalizing each of said dimensions as a lattice, each lattice including a union of elements in said latticed dimensions and an intersection of elements in said latticed dimensions, wherein each said lattice corresponds to one of a single one of said dimensions or a plurality of said dimensions;

defining a position of each object within each dimension;

annotating said object with tokens corresponding to the position of the object in each dimension;

receiving the external fuzzy query that includes a subset of the objects, a subset of the dimensions, a value limiting a number of returned collections, and a quality function for evaluating a quality of any candidate non-overlapping collection from all candidate non-overlapping collections having a size that is less than or equal to the limiting value;

selecting an algorithm based on said external fuzzy query, said algorithm being selected from the group consisting of: discovery, max-monotone and sum-additive;

determining an order of processing said dimensions within a subset of said dimensions;

applying said selected algorithm to each of said dimensions in the order of processing of said dimensions;

returning a non-overlapping collection from the candidate non-overlapping collections using a complex query algorithm, wherein the quality of the returned non-overlapping collection as defined by the quality function is at least as great as the quality of any other candidate non-overlapping collection, wherein said multi-structural database includes only semi-structured or unstructured data.

2. The method of claim 1, wherein the non-overlapping collection includes a pairwise-disjoint collection representing a set of elements of a lattice of at least one dimension.

3. The method of claim 2, wherein the pairwise-disjoint collection includes a sequential pairwise-disjoint collection.

4. The method of claim 1, further comprising computing the returned non-overlapping collection for any of:

a single numerical dimension;

a single hierarchical dimension;

and a collection of numerical and hierarchical dimensions.

5. The method of claim 1, wherein a divide query causes the selection of the max-monotone algorithm.

6. The method of claim 1, wherein the sum-additive algorithm causes the selection of a query type selected from the group consisting of:

a differentiate query type;

a growth query type;

a recency query type;

and a value query type.

7. A computer program product having a plurality of executable instruction codes stored on a computer-readable medium for performing a high-level multi-dimensional external fuzzy query on a multi-structural database, comprising:

a set of instruction codes which when loaded into a computer system causing said computer to receive a set of objects, a set of dimensions, said set of dimensions being selected as at least one of the group consisting of: time, content type, geography, and topic;

a set of instruction codes which when loaded into a computer system causing said computer to formalize each of said dimensions as a lattice, each lattice including a union of elements in said latticed dimensions and an intersection of elements in said latticed dimensions, wherein said lattice corresponds to one of a single one of said dimensions or a plurality of said dimensions;

a set of instruction codes which when loaded into a computer system causing said computer to receive the external fuzzy query that includes a subset of the objects, a subset of the dimensions, a value limiting a number of returned collections, and a quality function for evaluating a quality of any candidate non-overlapping collection from all candidate non-overlapping collections having a size that is less than or equal to the limiting value;

a set of instruction codes which when loaded into a computer system causing said computer to select an algorithm based on said external fuzzy query, said algorithm being selected from the group consisting of: discovery, max-monotone and sum-additive;

a set of instruction codes which when loaded into a computer system causing said computer to determine an order of processing of said dimensions within a subset of said dimensions;

a set of instruction codes which when loaded into a computer system causing said computer to apply said selected algorithm to each of said dimensions in the order of processing of said dimensions; and a set of instruction codes which when loaded into a computer system causing said computer to return a non-overlapping collection from the candidate non-overlapping collections using a complex query algorithm, wherein the quality of the returned non-overlapping collection as defined by the quality function is at least as great as the quality of any other candidate non-overlapping collection, wherein said structural database only includes semi-structured and unstructured data.

8. The computer program product of claim 7, wherein the non-overlapping collection includes a pairwise-disjoint collection representing a set of elements of a lattice of at least one dimension.

9. The computer program product of claim 8, wherein the pairwise-disjoint collection includes a sequential pairwise-disjoint collection.

10. The computer program product of claim 8, further comprising a set of instruction codes when loaded into a computer system causing said computer to compute the returned non-overlapping collection for any of:

a single numerical dimension;

a single hierarchical dimension;

and a collection of numerical and hierarchical dimensions.

11. The computer program product of claim 7, wherein the query is selected from the group consisting of:

a discover query type;

a divide query type;

a differentiate query type;

a growth query type;

a recency query type; and a value query type.

* * * * *